May 16, 1961 P. B. SHAFFER 2,984,528
THRUST BEARING ARRANGEMENT FOR ROTATING MACHINES
Filed March 30, 1959
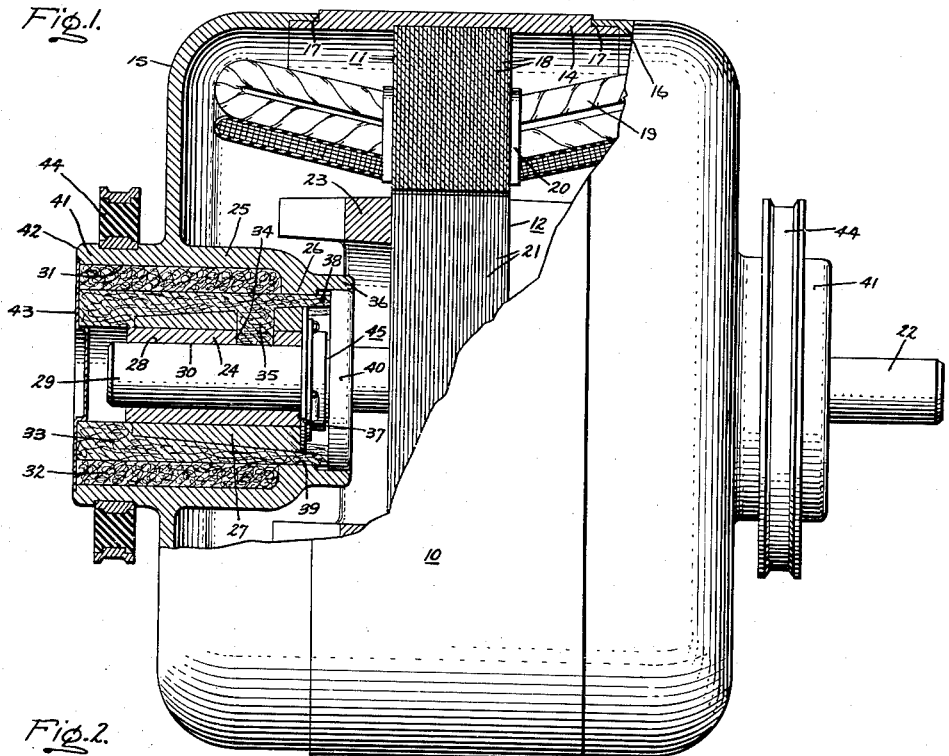
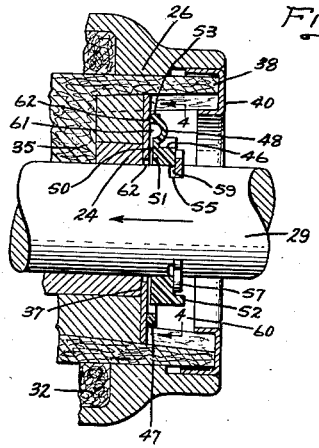
Inventor:
Paul B. Shaffer,
by H. F. Manbek, Jr.
Attorney.

United States Patent Office 2,984,528
Patented May 16, 1961

2,984,528

THRUST BEARING ARRANGEMENT FOR ROTATING MACHINES

Paul B. Shaffer, De Kalb, Ill., assignor to General Electric Company, a corporation of New York Filed Mar. 30, 1959, Ser. No. 803,010

8 Claims. (Cl. 308—163)

This invention relates to electric motors and other apparatus having rotatable parts, and more particularly to an improved axial thrust bearing and oil slinger arrangement for the same.

In the operation of electric motors, as for example, a squirrel-cage motor having the usual structure of the rotor bars, an axial end bump vibration of the rotor and shaft assembly may be set up. In the usual thrust bearing arrangement, a wear or thrust washer is normally provided between a thrust shoulder or its equivalent on the motor shaft and a stationary thrust shoulder generally formed by the end of a stationary bearing. Thus, vibration causes a noticeable movement of the washer between the thrust shoulders. Such movement or vibration gives rise to a knocking or bumping sound which is extremely objectionable. Further, it is essential for proper motor operation that the shaft should not move appreciably in an axial direction during rotation, for an excessive amount of axial movement, known as end play, will detrimentally affect machine performance. Moreover, axial freedom of movement of the shaft may have a pronounced effect on the operation of a device being driven by the electric motor. For instance, where an electric motor drives a part which rotates within a seal intended to keep fluid out, leakage through the seal is pronouncedly affected by the amount of shaft end play. In addition, it is important, of course, to provide adequate lubrication to the shaft as it rotates within its journaling means and also to the thrust surfaces which, when engaged, take up the axial thrust of the shaft thereby maintaining the shaft and the rotor in proper axial position relative to the remainder of the motor.

All of the foregoing considerations add to the complexity of the motor construction and increase the cost of manufacture. Thus, it will be seen that the provision of satisfactory, yet inexpensive, thrust bearing arrangements is a continuing problem in motor manufacture, particularly in the fractional horsepower sizes.

Accordingly, it is a primary object of this invention to provide improved thrust bearing structure involving a minimum of parts and of manufacturing costs.

It is a further object of the invention to provide an improved thrust bearing arrangement in which a single thrust member not only cushions the axial vibration of the rotor and shaft assembly during rotation, but also acts as an axial end play limiting member and as an oil slinger means.

Another object is to provide a thrust bearing structure which is inexpensive and easily assembled, is accurate in axial dimension, and by which undesirable noise produced by axial rotor and shaft movement is minimized.

Further objects and advantages will become apparent as the following description proceeds and the subject matter which I regard as my invention is pointed out with particularity in the claims annexed to and forming a part of this specification.

In carrying out the objects of this invention in one form thereof, I provide an electric motor having a rotor, a shaft rotatably carrying the rotor, and means rotatably supporting the shaft with an improved axial thrust cushioning and end play limiting arrangement. The arrangement comprises a stationary thrust receiving means having a stationary thrust face and a thrust bearing member fixedly secured to rotate with the rotor shaft at a predetermining distance from the rotor, between the rotor and the stationary thrust face. The thrust member includes an inner section having a thrust surface disposed towards the stationary thrust face, and an outer section having a thrust surface radially spaced from the inner thrust surface and being formed on the same side of the member as the inner thrust surface. Resilient connecting means join the sections together and normally bias the outer thrust surface axially beyond the inner thrust surface toward the stationary thrust. Under relatively light axial loads, the outer thrust surface transmits axial thrusts to the stationary thrust face and the resilient connecting means provides a cushioning effect on shaft axial movement as the load varies. When a heavier thrust load is applied, the inner thrust surface of the thrust member is moved axially into abutting engagement with the thrust receiving means. Since the thrust member is fixedly mounted to the rotating shaft and in abutting relationship with the stationary thrust receiving means, the axial thrust is transmitted to the stationary means and the shaft is prevented from further movement in an axial direction. Moreover, when the thrust member is utilized in a motor employing a recirculatory lubricating system, the resilient means, which connect the outer and inner sections of the thrust member, is capable of functioning as oil slinging means to effectively assist in returning the lubricant to the lubricant reservoir.

For a better understanding of the invention, reference may be had to the accompanying drawing which illustratest one embodiment of the present invention.

In the drawing:

Figure 1 is a side elevational view of an electric motor assembly, the view being partially broken away and partially in section in order to illustrate detail;

Figure 2 is an enlarged sectional view of a portion of the structure shown in Figure 1, illustrating the thrust bearing arrangement of the present invention being used under light axial thrust load conditions;

Figure 3 is a similar view to Figure 2, showing the thrust bearing arrangement being employed under heavier axial thrust load conditions;

Figure 4 is a sectional view of the thrust bearing structure taken on line 4—4 of Figure 2; and Figure 5 is a perspective view of the improved thrust bearing member of the present invention.

Referring now to Figure 1 of the drawing, the invention is there shown applied to a small motor 10 of the squirrel-cage induction type. The motor comprises a stator 11 and rotor 12 which are contained within a motor housing or frame 13. For convenience and ease of assembly, motor frame 13 is illustrated as being comprised of essentially three members; a central cylindrical portion 14 and two cup-shaped end shield members 15 and 16 which engage portion 14 by means of rabbeted surfaces 17. The stator 11 is formed in the standard manner, comprising a plurality of stacked thin laminations 18 of magnetic material, and energizing coils 19 are mounted in slots (not shown) suitably provided therein. An insulating member 20 is contained in each stator slot, juxtaposed between the slot wall and the coils 19. The rotor 12 comprises a stack of thin laminations 21, secured to a shaft 22 in any suitable fashion (not shown), and windings 23 of the squirrel-cage type, which may be die cast in the laminations in accordance with modern practice.

The shaft 22 is rotatably carried on opposite sides of the rotor by stationary sleeve type bearings 24 which in turn are secured in the respective end shield members of the motor frame by any suitable manner, such as will be described hereinafter. For simplicity of illustration, only one end of the rotor and shaft assembly and associated supporting means have been illustrated in detail in Figure 1, but it is understood that the other end of the assembly may be supported in the same manner. As shown, bearing 24 is fixedly secured within a substantially cylindrical bearing housing 25 formed integrally with motor end shield 15. Housing 25 is provided with an inwardly projecting wall 26 and integral spider members (not shown) which terminate in a longitudinally extending central bearing support 27 having the sleeve bearing 24 rigidly mounted therein. Thus, with this construction, rotatable shaft 22 has a bearing support surface 28 formed by the engagement of the shaft end portion 29 with the inner surface 30 of the sleeve bearing 24.

In order to provide suitable lubrication to the bearing surfaces of the shaft 22, a lubricant reservoir 31 is provided within bearing housing 25 surrounding bearing support 27. The reservoir is filled with lubricant retaining means, such as loose lubricant absorbent material 32, preferably composed of loose wool, and an oil impregnated felt pad 33 which functions as a wick means. In order to supply lubricant from the lubricant reservoir to the bearing surfaces, a lubricant feeding passage 34 is disposed in the upper side of the bearing sleeve 24 and bearing support 27. Portion 35 of the pad or wick is arranged within the passage and is in direct communication between the lubricant reservoir 31 and shaft portion 28. Lubricant, such as any suitable oil, is placed in the reservoir and is substantially absorbed by the loose wool and the wick, such that the oil is fed at a desired rate to shaft portion 28 for lubricating purposes.

An annular flange member 36, integrally formed with the bearing housing 25, extends axially inwardly toward the rotor 12, beyond a stationary thrust receiving means or face, generally indicated at 37. As seen in more detail in Figures 2 and 3, this flange member 36 surrounds a plurality of axially extending wick leg sections 38, which correspond to the number of bearing housing openings 39 provided in housing wall 26. Thus, lubricant thrown outwardly from shaft 22 during rotation may be caught by the wick leg sections 38 and returned to the reservoir for reuse. To ensure against leakage of the lubricant to the interior part of the motor, a cap member 40 is mounted within flanged member 36. The cap extends radially inwardly toward the shaft and augments the return of the lubricant to wick leg section 38 and hence the return of the lubricant into the reservoir for recirculation.

The outer portion or hub 41 of the bearing housing, at its end 42 remote from the rotor 12, is provided with a closure member in the form of the pressed cup 43, thereby enclosing the lubricant reservoir 31. Resilient motor mounting annuli 44 are provided at either end of the motor frame 13 on hubs 41 and the annuli may be firmly clamped to any standard motor support base by any conventional clamping means (not shown) to mount the motor assembly in a stationary manner.

Now in accordance with the preferred embodiment of the present invention, the thrust bearing arrangement includes a thrust bearing member 45, more clearly illustrated in Figures 2 through 5 inclusive. Member 45 is preferably formed of a tough, wear-resistant material having a self lubricating property, for example nylon, and comprises inner and outer coaxially arranged, radially spaced apart annular sections 46 and 47 respectively. Sections 46 and 47 are joined by a plurality of arcuate-shaped intermediate spring like arms 48, formed integrally with sections 46 and 47. As seen in Figures 3-5, inner section 46 is in effect a hub having a shaft receiving bore 49 and a radially extending thrust surface 50 at one of its ends 51. An axially extending protuberance or lug 52 is provided on the outer end 53 of inner section 46. Outer section 47 is formed with a thrust surface 54 on the same side of member 45 as is located the inner thrust surface 50, both thrust surfaces preferably being substantially perpendicular to the axis of shaft 22. Further, intermediate arms 48 normally bias and maintain outer thrust surface 54 axially outward, beyond the thrust surface 50 of inner end portion 51. The significance of the foregoing arrangement will become more apparent from the following description.

Member 45 is assembled onto shaft 22 and fixedly secured thereto for rotation with the shaft at a predetermined distance from rotor 12 by any suitable means, such as by an interference fit between bore 49 and the peripheral surface of shaft 22. In order to augment this securing arrangement, shaft 22 is provided with a pair of diametrically disposed grooves 55 and 56 cut transversely across the periphery of the shaft, the grooves being adapted to accommodate and hold stationary therein a standard generally U-shaped snap ring 57. With this construction, edge 58 of the snap ring is adapted to engage lug 52 upon any slipping of the member 45 relative to the shaft, thereby ensuring the rotation of member 45 with rotatable shaft 22. In addition, face 59 of the snap ring abuts end 53 of member 45, limiting axial movement of member 45 toward rotor 12.

Referring now to Figures 2 and 3, it can be seen that thrust member 45, as mounted in the assembled motor, is contained within recess 60, formed by the flange member 36 and housing wall 26. A thrust or wear washer 61 is loosely fitted onto shaft 22, being positioned between the stationary thrust face 37 and the rotatable thrust surfaces 50 and 54 of member 45, in abutting relationship with face 37 and member 45. The stationary wall 26, as shown, forms a continuation of the stationary thrust face 37, and engages the outer portions of the washer 61. Washer 61 may be made of any suitable material capable of withstanding long continuous wear, such as steel.

The manner in which the preferred embodiment of my invention operates will become clear from an examination of Figures 2 and 3. In Figure 2, my thrust bearing arrangement is illustrated under relatively light axial load conditions. For example, in motors of the fractional horsepower size, axial loads up to ten pounds thrust may be considered as being relatively light. Assuming, therefore, that the thrust member 45 is designed to have thrust surface 54 transmit or carry the thrust load up to ten pounds thrust, it can be seen that a light axial thrust in the direction of the arrow in Figure 2 (towards the stationary thrust shoulder 37) will cause outer thrust surface 54 to engage and to bear against wear washer 61 at a point 62, radially outwardly from shaft 22. Washer 61 in turn is held tightly against stationary thrust shoulder 37, acting as a thrust receiving means. Thus, although outer section 47 of thrust member 45 is continuously biased against washer 61 by resilient arms 48, axial movement in the direction of the arrow is still possible by the shaft and inner section 46 of the thrust member 45. However, such movement under light load conditions is resisted and controlled by the spring like action of the biasing arms 48, providing a cushioning effect on the axial travel of the shaft and rotor. The washer is prevented from being vibrated between the stationary thrust face 37 and the movable thrust surface 54 of member 45 since it is continuously held against stationary thrust face 37 as explained above. This results in the elimination of objectionable knocking or bumping sounds due to the vibration of the washer against the thrust shoulders. In addition, the axial movement of the shaft is effectively controlled and limited under light loads.

In those motors which incorporate a recirculatory lubricating system, member 45 has the additional feature of providing an oil slinging function under light load conditions. As the oil, which is fed to the shaft from the reservoir during motor operation, moves between the inner peripheral surface 62 of wear washer 61 and the outer peripheral surface of the shaft 22, it will be centrifugally forced radially outwardly from the shaft, between the inner section 46 of member 45 and the wear washer. Member 45 is effective in directing the oil outwardly toward the lubricant return means in two ways. Due to its interference fit with the outer peripheral shaft surface, it provides an oil seal with the shaft and prevents further creepage of the oil along the shaft to the interior of the motor. In addition, arcuate-shaped arms 48 help throw and guide this oil outwardly into contact with wick sections 38 which, in turn, will return the oil to the reservoir 31 for recirculation.

Under heavier axial loads, the slinger-thrust arrangement will take the position as indicated in Figure 3. Assuming, as in the case of Figure 2, that the direction of the axial thrust is being applied toward the stationary thrust shoulder 37, the resistance of arms 48 are overcome and the shaft and rotor assembly moves in the direction indicated by the arrow, away from stator 11. Thus, inner thrust surface 50 of member 45 is forced into engagement with wear washer 61, thereby supplementing the thrust transmission provided by the thrust surface of outer section 47. Since member 45 is firmly mounted on shaft 22, as previously described, an inner section 46 abuts firmly against wear washer 61, which in turn is held tightly against stationary thrust shoulder 37, shaft 22 and rotor 12 are prevented from moving in an axial direction away from stator 11. Therefore, during operation of the motor under heavier axial loads, wear washer 61 is held firmly between the thrust surfaces of member 45 and stationary shoulder 37, eliminating any possible vibration of the washer and the end play of the shaft is effectively limited. Any movement of the shaft and rotor in a direction away from stationary thrust surface 37 will, of course, lessen the thrust load on the thrust member 45 and when ten pounds thrust is once again attained, (light axial thrust load conditions), the inner thrust surface 50 will be forced out of engagement with wear washer 61 by arms 48. Thus, once again only outer thrust surface 54 will contact washer 61, retaining it against the stationary shoulder 37 due to the biasing action of arms 48; hence, the washer cannot vibrate and cause objectionable noise. Obviously, the axial distance that the outer thrust surface is biased beyond the inner thrust surface of member 45 will determine the amount of end play which the shaft is allowed to have, assuming that it is desired to have outer thrust surface 54 in continuous engagement with the wear washer, even under no load conditions.

With this arrangement, it is therefore apparent that during operation of the motor under light axial loads, member 45 not only cushions axial movement of the shaft but, in addition, controls and limits shaft end play. Due to the continuous biasing of the outer annular section 47 against the wear washer 61 by spring like arms 48, the shaft 22 is automatically restored toward a center position after the light axial forces on the shaft have been removed and smooth motor operation is ensured. Further, the arcuate arms 48 of thrust member 45 act as oil slinging means and assist in directing the return of the oil, flung centrifugally outwardly during shaft rotation, to the oil reservoir for reuse. Under heavier loads member 45 effectively transmits the thrust load and limits axial movement of the shaft, resulting in efficient motor performance.

Although, only the one side of the motor has been described in detail, it is understod that a similar thrust bearing arrangement may be employed on the other side of the rotor to complete that axial-movement limiting means, if desired.

The structure here disclosed utilizes a minimum of parts to achieve the desired control and limitation of end play, as well as to provide a cushioning means ensuring a minimum of motor operating noise. Further, there is provided an effective oil slinging means. Moreover, all the parts are exceedingly simple and inexpensive to produce and readily assembled. Further, the improved thrust bearing construction disclosed herein provides an effective means for controlling end play within close tolerances, without requiring that the laminations of the rotor stack be manufactured to comparable tolerances.

It will be apparent that while in accordance with the patent statutes, I have illustrated and described my invention in its presently preferred form, changes may be made in the structure disclosed, without departing from the true spirit and scope of the invention, and I therefore intend in the following claims to cover all such equivalent variations as fall within the invention.

What I claim as new and desire to secure by Letters Patent of the United States is:

1. In an electric motor, a shaft, a rotor fixedly secured on said shaft, means rotatably supporting said shaft, and a thrust bearing arrangement comprising stationary thrust receiving means, a thrust member mounted on said shaft between said rotor and said thrust receiving means, said thrust member comprising an inner section having a thrust surface disposed towards said stationary thrust receiving means, an outer section radially spaced from said inner section and having a thrust surface formed on the same side of said member as said inner thrust surface, resilient connecting means joining said inner and outer sections with said outer thrust surface being normally biased by said connecting means axially beyond said inner thrust surface toward said stationary thrust receiving means, said sections being axially movable relative to each other whereby one of said thrust surfaces transmits thrusts to said thrust receiving means and cushions axial movement of said shaft under relatively light axial loads and the other thrust surface limits axial movement of said shaft under heavier loads.

2. In an electric motor, a shaft, a rotor fixedly secured on said shaft, means rotatably supporting said shaft, and a thrust bearing arrangement comprising stationary thrust receiving means, a thrust member mounted on said shaft between said rotor and said thrust receiving means, said thrust receiving means including a stationary thrust face and a thrust washer positioned on said shaft between said thrust face and said thrust member, said thrust member comprising an inner section having a thrust surface disposed toward said thrust washer, an outer section radially spaced from said inner section and having a thrust surface formed on the same side of said member as said inner thrust surface, resilient intermediate connecting means joining said inner and outer sections with said outer thrust surface being normally biased by said connecting means axially beyond said inner thrust surface toward said thrust washer, said sections being axially movable relative to each other whereby under relatively light axial loads said outer thrust surface transmits thrust to said stationary thrust face through said thrust washer and cushions axial movement of said shaft and under heavier axial loads the inner thrust surface limits axial movement of said shaft.

3. In an electric motor, a shaft, a rotor fixedly secured on said shaft, means rotatably supporting said shaft, and a thrust bearing arrangement comprising stationary thrust receiving means, a thrust member mounted on said shaft between said rotor and said thrust receiving means, said thrust member comprising an inner section having a thrust surface disposed towards said stationary thrust receiving means, an outer section radially spaced from said inner section and having a thrust surface formed on the same side of said member as said inner thrust surface, a resilient connecting means joining said inner and outer sections with said outer thrust surface being normally biased by said connecting means axially beyond said inner thrust surface, said resilient means comprising a plurality of biasing arms integrally formed with said inner and outer sections, said sections being axially movable relative to each other whereby under relatively light axial loads the outer thrust surface transmits thrust to said stationary thrust receiving means and cushions axial movement of said shaft and under heavier axial loads the inner thrust surface limits axial movement of said shaft.

4. In an electric motor, a shaft, a rotor fixedly secured on said shaft, bearing means rotatably supporting said shaft, and a thrust bearing arrangement comprising a stationary thrust receiving member having a thrust receiving face, a thrust bearing member mounted on said shaft between said rotor and said face, a wear washer loosely received on said shaft between said thrust face and said thrust bearing member, said thrust bearing member comprising an inner section having a thrust surface disposed towards said wear washer, an outer section radially spaced from said inner section and having a thrust surface formed on the same side of said member as said inner thrust surface, a resilient connecting means joining said inner and outer sections with said outer thrust surface being normally biased by said connecting means, axially beyond said inner thrust surface, said resilient means being adapted to operate as an oil slinger during rotation of said shaft, said sections being axially movable relative to each other whereby under relatively light axial loads said outer thrust surface transmits thrust to said stationary thrust face through said washer and cushions axial movement of said shaft and under heavier loads the inner thrust surface limits axial movement of said shaft.

5. In an electric motor, a shaft, a rotor fixedly secured on said shaft, means rotatably supporting said shaft, means for lubricating said shaft during rotation of said shaft including a lubricating reservoir, lubricant retaining means, lubricant feeding means, and lubricant return means for returning lubricant to said reservoir after use, and a thrust bearing arrangement comprising a stationary thrust receiving member having a thrust receiving face, a thrust bearing member mounted on said shaft between said rotor and said thrust receiving face, a wear washer loosely received on said shaft between said thrust face and said thrust bearing member, said thrust bearing member comprising an inner section having a thrust surface disposed towards said wear washer, an outer section radially spaced from said inner section and having a thrust surface formed on the same side of said member as said inner thrust surface, a plurality of resilient arcuate-shaped arms joining said inner and outer sections with said outer thrust surface being normally biased by said arms axially beyond said inner thrust surface, said arms during shaft rotation acting as an oil slinger to direct lubricant passing along said shaft toward the oil return means, said sections being axially movable relative to each other whereby under relatively light axial loads said outer thrust surface transmits thrust to said stationary thrust face through said washer and cushions axial movement of said shaft and under heavier loads the inner thrust surface limits axial movement of said shaft.

6. A thrust bearing member for use in an electric motor having rotatable parts, said member comprising an inner section having an axially extending bore arranged to be mounted onto a shaft and having at least one thrust surface, an outer section radially spaced from said inner section and having a thrust surface disposed on the same side of said thrust member as said inner surface, at least one of said thrust surfaces formed substantially perpendicular to said axially extending bore, and means movably connecting said thrust surfaces, one of said thrust surfaces being normally biased axially beyond the other of said thrust surfaces and being axially movable relative thereto whereby each thrust surface effectively transmits the axial thrust load under different thrust conditions.

7. A thrust bearing member formed of wear resistant material for use in an electric motor having rotatable parts, said member comprising an inner section having an axially extending shaft receiving bore and having means for holding said thrust bearing member on a shaft to rotate therewith, a thrust surface formed substantially perpendicular to said axially extending bore on at least one of the end portions of said inner section, an outer section radially spaced from said inner section and having a thrust surface disposed on the same side of said thrust member as said inner thrust surface, a resilient connecting means joining said inner and outer sections with said outer thrust surface being normally biased by said connecting means axially beyond said inner thrust surface, whereby said sections are axially movable relative to each other.

8. An oil slinger-thrust bearing member formed of wear resistant material for use in an electric motor having rotatatable parts, said member comprising an annular inner section having a shaft receiving bore and a thrust surface formed on one of its end portions, an outer section radially spaced from said inner section and having a thrust surface disposed on the same side of said member as said inner thrust surface, a resilient connecting means integrally formed with and joining said inner and outer sections, said means comprising a plurality of arcuate-shaped intermediate arms normally biasing said outer thrust surface axially beyond said inner thrust surface, said arms forming oil slinging means for said member and allowing axial movement of said sections relative to each other.

References Cited in the file of this patent

UNITED STATES PATENTS

| | | |
|---|---|---|
| 2,316,693 | Hoddy | Apr. 13, 1943 |
| 2,912,290 | Shaffer | Nov. 10, 1959 |